US007517183B2

(12) United States Patent
Waisanen

(10) Patent No.: US 7,517,183 B2
(45) Date of Patent: Apr. 14, 2009

(54) GONDOLA TIPPING SYSTEM

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 640 days.

(21) Appl. No.: 11/087,294

(22) Filed: Mar. 23, 2005

(65) Prior Publication Data

US 2005/0211654 A1 Sep. 29, 2005

(51) Int. Cl.
*B65G 67/32* (2006.01)

(52) U.S. Cl. ........................ 414/386; 212/330; 414/581

(58) Field of Classification Search ................. 212/330, 212/331, 335; 414/386, 575, 581, 582
See application file for complete search history.

(56) References Cited

U.S. PATENT DOCUMENTS 66,079 A * 6/1867 Goodsell .................... 212/337
250,779 A * 12/1881 Brown ...................... 294/68.26
320,047 A * 6/1885 Chambard ............... 294/82.11
1,628,732 A * 5/1927 Mitchell ...................... 414/366
1,931,071 A * 10/1933 Halstead ...................... 212/286
2,398,695 A 1/1946 Kling
2,411,228 A 11/1946 Poulsen
2,728,473 A * 12/1955 Pickard et al. .............. 414/422
3,351,213 A * 11/1967 Newman et al. ............ 212/275
3,478,907 A * 11/1969 Dechantsreiter ............ 414/420
3,907,133 A * 9/1975 Brooks ........................ 414/572
4,050,593 A 9/1977 Kalke
4,389,149 A 6/1983 Dancs
4,527,698 A * 7/1985 Nishihata et al. ............ 212/299
4,527,939 A 7/1985 Suarez
4,573,850 A 3/1986 Suarez
4,883,184 A * 11/1989 AlbuS ........................ 212/274
5,400,910 A * 3/1995 Luebke ........................ 212/104
5,893,471 A * 4/1999 Zakula ........................ 212/345

FOREIGN PATENT DOCUMENTS

GB 2 237 792 A * 5/1991

* cited by examiner

*Primary Examiner*—Thomas J. Brahan
(74) *Attorney, Agent, or Firm*—Porter, Wright, Morris & Arthur, LLP

(57) ABSTRACT

A gondola tipping system for tipping a pivotally mounted container includes a frame having a substantially horizontal beam, a trolley translatable across the beam, a winch mounted on the beam, and a lower block connectable to the pivotal container, the lower block being reeved to the trolley and winch such that rotation of the winch and translation of the trolley causes the lower block to move both vertically and horizontally.

23 Claims, 4 Drawing Sheets

GONDOLA TIPPING SYSTEM

FIELD OF THE INVENTION

The present invention relates to a tipping device for a gondola having a container pivotally attached to a wheeled base. Particularly, the invention relates to a tipping device having a hoist arrangement that lifts and tips the gondola container.

BACKGROUND

Gondolas, and such similarly related devices, are used in many industries to transport loose materials. Gondolas typically include a bucket or open-top container on a wheeled base. The container is hingedly connected to the wheeled base along one side so that the container can be tipped on its hinge and its contents emptied. For example, in the wine-making industry, gondolas are used to transport grapes from a field to a bin for processing into wine. Similarly, in the mining industry, hinged cargo containers are used to transport and dispense ore from a mine.

Conventional gondola tipping systems typically include a hoist and drive chain that lift and tip the gondola container to empty its contents. The hoist of a conventional gondola tipper includes a hook that is connected to one side of the container of the gondola opposite the hinged side of the container. The hoist lifts the hook, thereby lifting one side of the gondola container. The drive chain moves the hoist in a horizontal direction, positioning the hoist in different horizontal locations relative to the hinged side of the container. As the hook lifts one side of the gondola, the center of mass of the gondola and its contents pivot about the hinge. When the center of mass passes a vertical line extending upward from the hinge, gravity causes the container to tip over and rapidly accelerate downward, dumping its contents. The rapid downward acceleration of the container can place tremendous side load on the gondola tipping system, causing damage to the drive chain and potential harm to bystanders.

SUMMARY

In one embodiment, the present invention provides a gondola tipping system for a gondola including a pivotal container. The gondola tipping system includes a frame having a substantially horizontal beam supported above the ground, a trolley translatable along the beam, a winch mounted on the beam, and a lower block connectable to the pivotal container, the lower block being reeved to the trolley and the winch such that rotation of the winch and translation of the trolley causes the lower block to move both vertically and horizontally.

In another embodiment, the invention provides a tipping device for tipping a pivotally mounted container. The tipping device includes a frame having a substantially horizontal guide rail supported above the container, a trolley translatable along the guide rail, an upper coupled to the trolley and supporting at least one sheave, a winch mounted on the frame, an equalizing pulley mounted to the frame, and a lower block having a hook connectable to the gondola container. The lower block is reeved to the equalizing pulley, the upper block, and the winch by a hoist cable such that rotation of the winch and translation of the trolley causes the lower block to move both vertically and horizontally.

In a further embodiment, the invention provides a gondola tipping apparatus for tipping a pivotally mounted container. The gondola tipping apparatus includes a frame having a substantially horizontal guide rail supported above the container, a trolley having rollers engaged with the guide rail, and a rewind hoist having a cable reeved around at least two rollers on opposite ends of the guide rail and coupled to the trolley. The rewind hoist moves the trolley along the guide rail. A winch having a hoist cable attached to it is mounted on the frame. An equalizing pulley is mounted to the frame. A lower block has a hook connectable to the gondola container. The lower block is reeved to the equalizing pulley, the trolley, and the winch by the hoist cable such that rotation of the winch and translation of the trolley causes the lower block to move both vertically and horizontally.

In yet another embodiment, the invention provides a gondola tipping apparatus for tipping a pivotally-mounted container. The gondola tipping apparatus includes a frame having a substantially horizontal guide rail supported above the transport container and a trolley having rollers is engaged with the guide rail. A rewind hoist drives a cable reeved around at least two rollers at opposite ends of the guide rail. The cable is attached to the trolley. The rewind hoist provides a horizontal force that translates the trolley along the guide rail. An upper block is coupled to the trolley and supports at least one sheave. A winch is mounted on the frame and is attached to one end of a hoist cable. An equalizing pulley is mounted to the frame. The gondola tipping apparatus also includes a lower block having at least one sheave and a hook connectable to the gondola container. The lower block is reeved to the equalizing pulley, the upper block, and the winch by the hoist cable such that rotation of the winch provides a vertical force that moves the lower block vertically. A controller adjusts the aspect ratio of the vertical force and the horizontal force by simultaneously rotating the winch and translating the trolley so that the lower block moves through an arc.

In another embodiment, the invention provides a tipping device for tipping a pivotally-mounted container. The tipping device includes a frame having a substantially horizontal guide rail supported above the transport container, a trolley translatable along the guide rail, an upper block coupled to the trolley and supporting at least one sheave, a winch mounted on the frame, and a lower block having a hook connectable to the gondola container. The lower block is reeved to the upper block and the winch by a hoist cable such that rotation of the winch and translation of the trolley causes the lower block to move both vertically and horizontally. A shock absorber is mounted to the frame and receives one end of the hoist cable.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
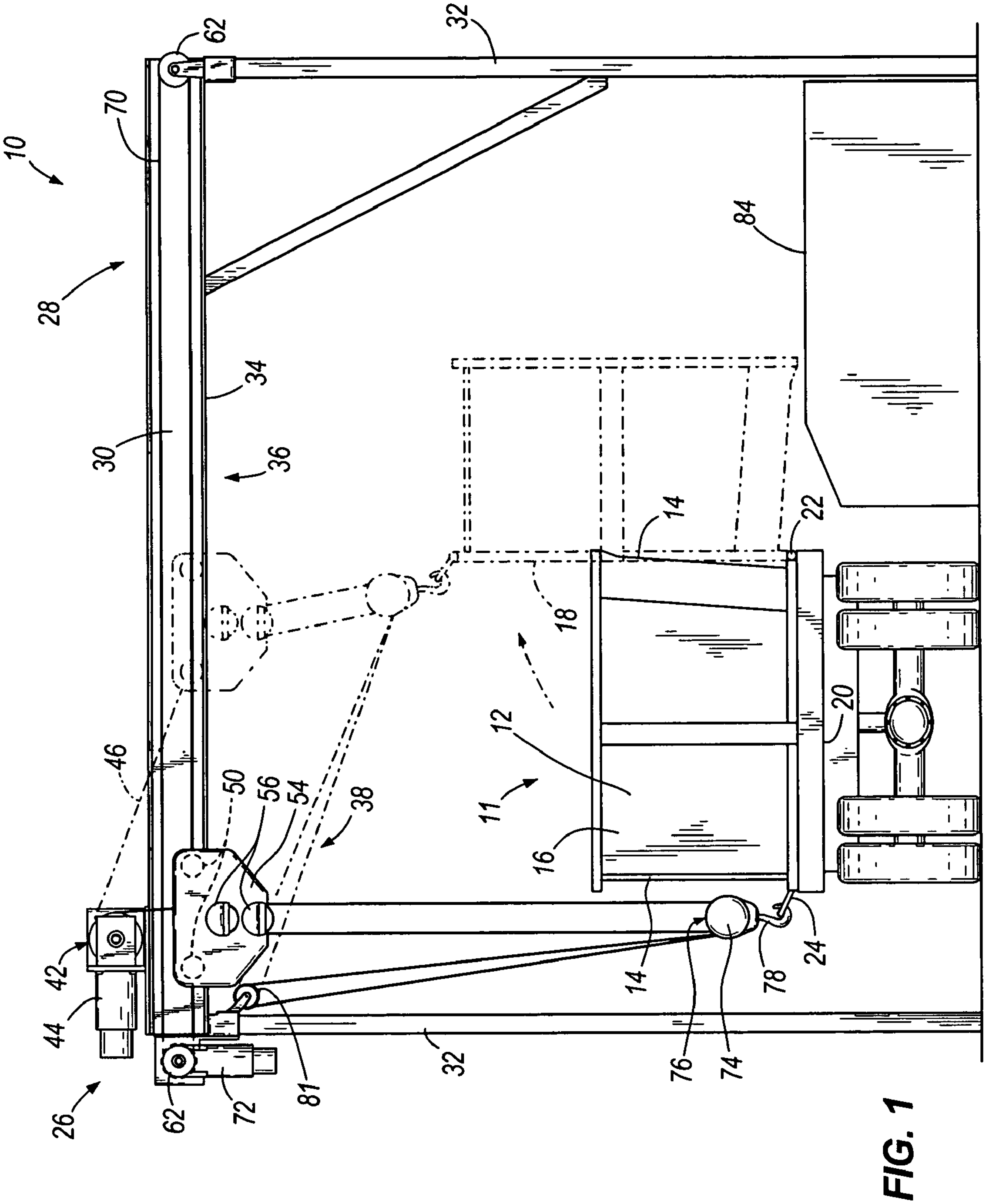
FIG. 1 is a front view of a gondola tipping system engaged with a gondola and showing a container of the gondola in a first and second position.

FIG. 1 illustrates a gondola tipping apparatus 10 according to an embodiment of the present invention. The gondola tipping apparatus 10 can be used to tip and empty a gondola 11, or other pivotally-mounted container, of its contents.

As shown in FIG. 1, the gondola 11 comprises a container 12 having a pair of opposing side walls 14, a pair of end walls 16 (one of which is hidden from view), and a bottom wall 18. The bottom wall 18 of the container 12 sits on a wheeled base 20 that can be configured for road or rail transport. The container 12 is attached to the wheeled base 20 by a hinge 22 that runs near the bottom edge of one side wall 14. The hinge 22 provides a pivotal axis about which the container 12 may be rotated to dump its contents. In some embodiments, a protrusion 24, such as a ring, or rod extending between a pair of spaced-apart brackets, is attached to the side wall 14 opposite the hinged wall. The protrusion 24 can be used to engage the gondola tipping apparatus 10 with the container 12.

Figure 2:
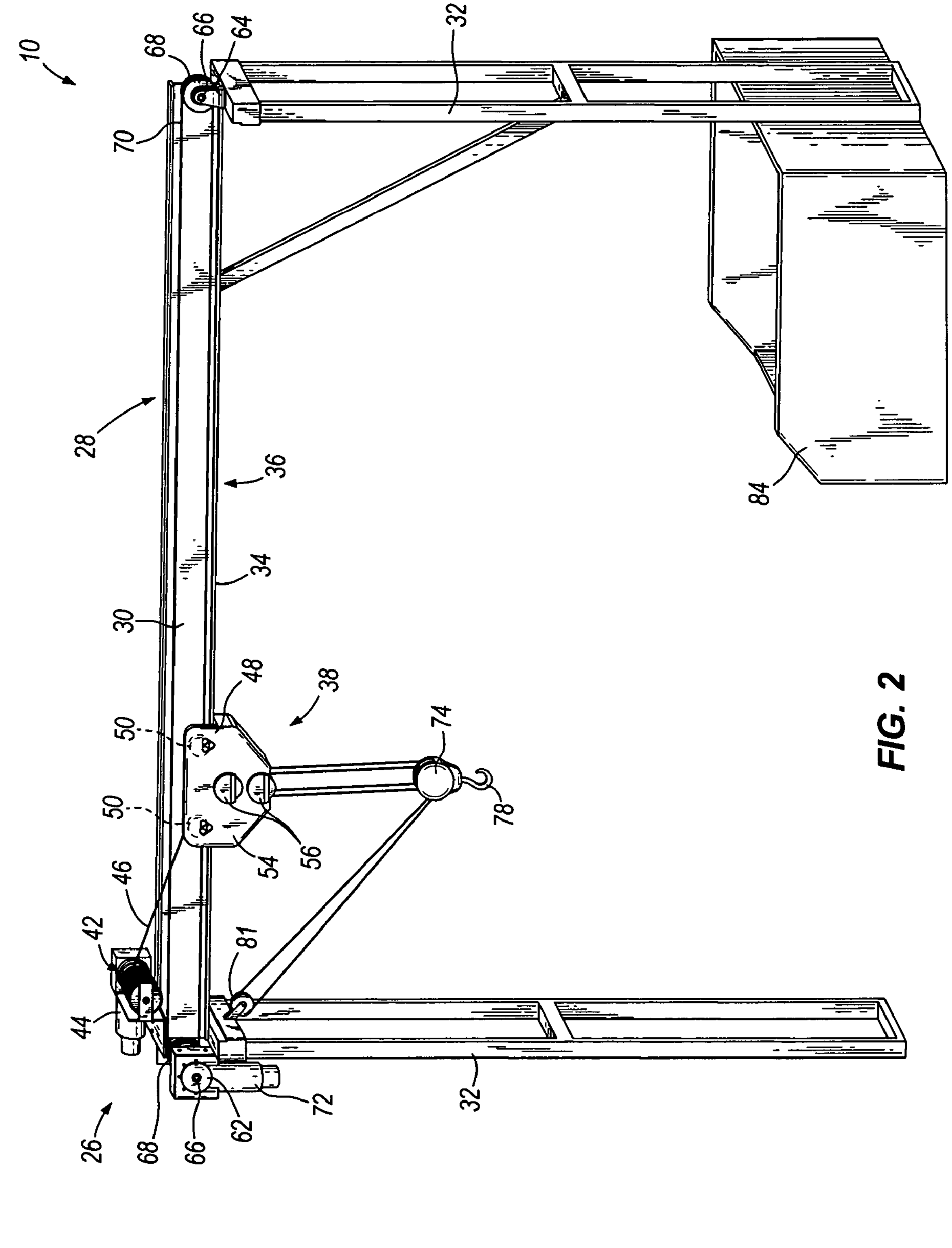
FIG. 2 is a perspective view of the gondola tipping system of FIG. 1.
Figure 3:
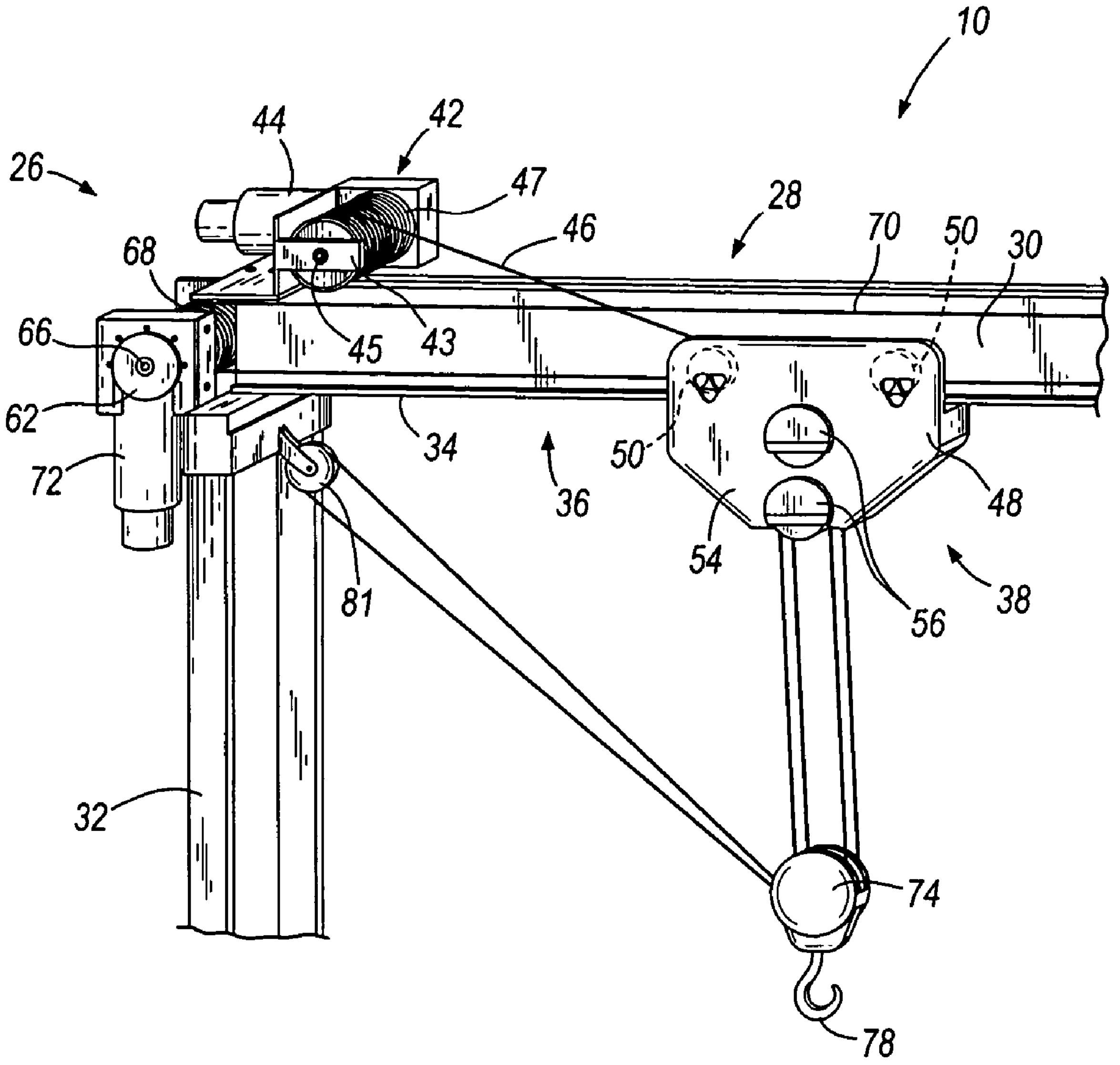
FIG. 3 is an enlarged perspective view of a hoist assembly of the gondola tipping system of FIG. 1.

The gondola tipping apparatus 10 includes a hoist assembly 26 supported above the gondola 11 by a frame 28. The frame 28 comprises a substantially horizontal beam 30 supported by a pair of structural members 32 positioned on opposite sides of the gondola 11. In one embodiment, as shown in FIGS. 1-3, outwardly extending flange 34 run lengthwise along the horizontal beam 30 defining a guide rail 36. The guide rail 36 supports a trolley 38, as will be explained in greater detail below.

The frame 28 supports the hoist assembly 26 that lifts and translates the container 12 about its pivotal axis using a winch 42, a trolley 38, and a rewind hoist 62. As illustrated in FIGS. 1-3, the winch 42 is deck-mounted on one end of the horizontal beam 30. In one embodiment, the winch 42 has a bracket 43 on which is mounted a transversely extending shaft 45 that supports a grooved drum 47. A reversible electric motor 44 is connected to the shaft 45 to rotate the grooved drum 47 either clockwise or counter-clockwise. As will be explained below, one end of a hoist cable 46 is fastened to the grooved drum 47. When the motor 44 rotates the shaft in one direction, the hoist cable 46 is drawn up and wrapped around the grooved drum 47. When the motor 44 rotates the shaft 45 in the other direction, the hoist cable 46 is let out as it unwinds from around the grooved drum 47.

The trolley 38 is adapted to move lengthwise along the horizontal beam 30 using the guide rail 36. As best seen in FIG. 3, the trolley 38 comprises a pair of spaced apart members 48 (one of which is hidden from view) that straddle the underside of the horizontal beam 30. One or more rollers 50 are fastened to the inner side of each member 48 such that the rollers 50 from one member 48 engage the flange 34 extending from one side of the horizontal beam 30 and the rollers 50 from the other member 48 engage the flange 34 extending from the other side of the horizontal beam 30.

The trolley 38 supports an upper block 54 typically comprising one or more sheaves 56. In one embodiment, as shown in FIGS. 1-3, the upper block 54 is integrated with the trolley 38. In an alternative embodiment (not shown), the upper block 54 can be suspended from the trolley 38 using, for example, a hook, a clevis or a lug suspension.

The trolley 36 moves back and forth along the horizontal beam 30 using a rewind hoist 62. The rewind hoist 62 comprises a brackets 64 located at an ends of the horizontal beam 30 opposite a reversible rewind hoist motor 72. The bracket 64 supports a shaft 66 around which a grooved wheel 68, or grooved roller, is placed. A cable 70 driven by a drum (not shown) coupled to the rewind hoist motor 72 loops around the grooved wheel 68 and is fastened to the trolley 38. As illustrated in FIG. 2, the shaft is substantially perpendicular to the horizontal beam 30 and the cable loop extends along only one side of the horizontal beam 30. The reversible motor 72 drives the drum (not shown), thereby rotating the shaft 66 and its corresponding wheel 68 either clockwise or counter-clockwise. As the drum and shaft 66 rotate, the cable 70 similarly moves, pulling the trolley 38 in one direction or the other along with it. When the motor 72 turns one way, the trolley 38 travels along the guide rail 36 away from the winch 42. When the motor 72 turns the opposite way, the trolley 38 travels along the guide rail 36 towards the winch 42.

A lower block 74 connectable to the gondola container is reeved to the upper block 54 and the winch 42. The lower block 74 comprises one or more sheaves 76 upon which the hoist cable 46 is reeved. A fastener 78 is connected to the lower block 74 to engage the container 12 of the gondola 11. The fastener 78 can include a hook, a clamp, a latch, etc. In one embodiment, the fastener 78 and sheaves 76 can be mounted together on a single swivel. In an alternative embodiment, the fastener 78 can be mounted on a trunnion, and the sheaves 76 separately mounted on a pin.

The lower block 74 is vertically lifted and lowered by the action of the winch 42. As shown in FIG. 1, the hoist cable 46 is fastened at one end to the winch 42, reeved one or more times around the trolley 38 and lower block 75, reeved once around an equalizing pulley 81 attached to the frame 30, and fastened at the other end to the lower block 75. Alternatively, the hoist cable 46 can be fastened at one end to the winch 42, reeved one or more times around the trolley 38 and lower block 75, reeved once around the equalizing pulley 81, reeved once more around the lower block 75, and fastened at the other end to the upper block 54. The lower block 74, and similarly the container 12, are vertically lifted and lowered by winding and unwinding the hoist cable 46 onto and off of the winch 42.

Figure 4:
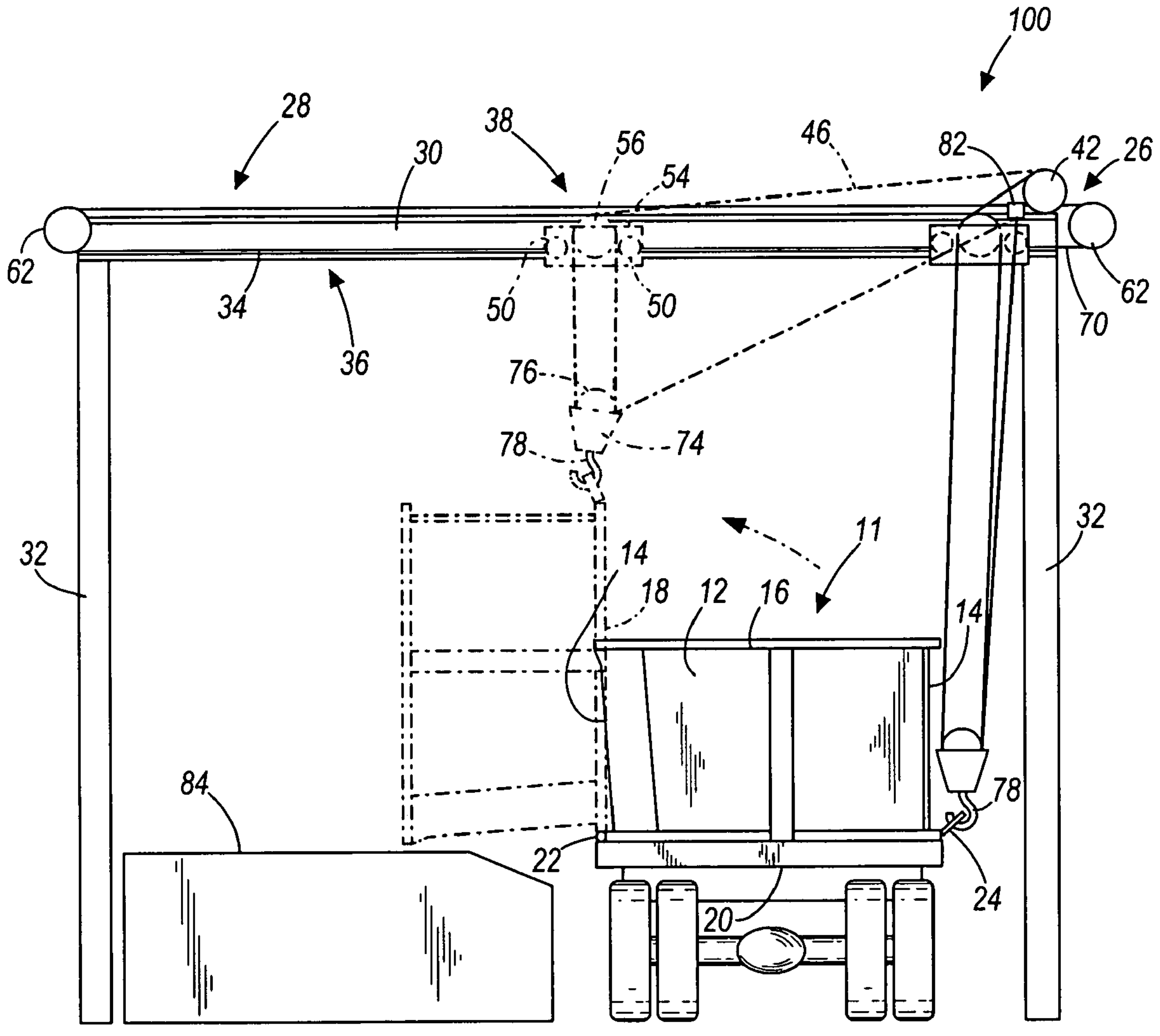
FIG. 4 is a front view of an alternative gondola tipping system engaged with a gondola and showing a container of the gondola in a first and second position.

In an alternative embodiment of the gondola tipping apparatus 100, as illustrated in FIG. 4, the hoist cable 46 is fastened at one end to the winch 42, reeved one or more times around the trolley 38 and the lower block 74, and fastened at the other end to a shock absorber 82. The shock absorber 82 is typically fastened to the horizontal beam 30 and includes one or more hydraulic shocks (not shown) that significantly reduce, or eliminate, shock loading. As will be described in more detail below, when the hoist assembly 26 is activated, the vertical lift provided by the winch 42 combines with the translational motion provided by the rewind hoist 62 to rotate the container 12 and its contents about the pivotal axis defined by the hinge 22. When the center of mass of the container 12 and its contents rotates past a vertical line extending upward from the pivotal axis (i.e., when the container passes "over center"), gravity causes the container 12 to exert a sudden, strong, downward force on the hoist assembly 26. The hydraulic shocks absorb the jolt to the hoist cable 48, significantly reducing or eliminating shock to the hoist assembly 26.

In operation, a gondola 11 is positioned under the gondola tipping apparatus 10, 100 with the hinge 22 of the gondola next to a hopper 84 or receiving area. The fastener 78 of the gondola tipping apparatus 10 is secured to the container 12 of the gondola 11. In the embodiments illustrated in FIGS. 1 and 4, the fastener 78 is a hook that engages with the protrusion 24 extending from the container 12. The hoist assembly 26 is activated, and the winch 42 and rewind hoist 62 operate in tandem to rotate the container 12 through an arc.

The hoist assembly 26 exerts both vertical and horizontal forces on the container 12 to move the container 12 through an arc. The winch 42, acting on the hoist cable 46 over the upper block 54 of the trolley 38, supplies the vertical force that lifts the container 12 off the wheeled base 20 of the gondola 11. When the hoist assembly 26 is activated, the winch motor 44 rotates the shaft 45 and grooved drum 47 in a direction that draws in the hoist cable 46 and wraps it around the grooved drum 47. As the hoist cable 46 is drawn in, the lower block 74 and fastener 78 are drawn upward toward the upper block 54, imparting a vertical force that raises the container 12 up off the wheeled base 20.

The rewind hoist 62 supplies the translational force that moves the container 12 towards the hopper 84. When the rewind hoist 62 is activated, the rewind hoist motor 72 rotates the shaft 66 and its corresponding drum 68 so that the cable 70 moves the trolley 38 along the guide rail 36 and away from the winch 42. As the trolley 38 moves along the guide rail 36, it carries the lower block 74 and fastener or hook 78 in a horizontal direction. This movement imparts a translational force that moves the container 12 towards the hopper 84.

The hoist assembly 26 combines the vertical force of the winch 42 with the translational force of the rewind hoist 62 to rotate the container 12 through an approximately 90 degree arc. The vertical force is varied by adjusting the speed of the winch motor 44. Similarly, the translational force is varied by adjusting the speed of the rewind hoist motor 72. The combined speeds of the two motors 44, 72 determine the resultant force acting on the container 12. Although it is preferable to exert a force comprising both a vertical and horizontal component, one could apply the vertical and horizontal forces separately and sequentially.

The winch motor 44 and rewind hoist motor 72 are variable speed motors adjusted by a single controller (not shown). The smoothest arc of travel for the container 12 would be one in which the motors were infinitely varied such that the resultant force on the container 12 along each point in its arc of travel was tangential to the arc. It may be more cost effective to vary the resultant force a limited number of times as the container is rotated through an arc. The resultant force can consist of a single horizontal component, a single vertical component, and any combination in between. Limit switches may be integrated into each motor 44, 72 and its cable 46, 70 to signal when the motors 44, 72 should change speed to apply a new force. The limit switches can include, but are not limited to, geared limit switches, encoders and resolvers.

In one embodiment, three resultant forces are applied to the container 12 to rotate the container 12 through a 90 degree arc. From about zero degrees to about 30 degrees, the vertical force dominates as the container 12 is lifted off the wheeled base 20. A typical aspect ratio of the vertical and horizontal forces is approximately 90:10. From about 31 degrees to about 60 degrees, the vertical and horizontal forces are roughly equivalent. A typical aspect ratio of the vertical and horizontal forces is approximately 50:50. Finally, from about 61 degrees to about 90 degrees, the horizontal force dominates as the container 12 is move towards the hopper 84. A typical aspect ratio of the vertical and horizontal forces is approximately 10:90. Using these aspect ratios, the hoist motors need not be infinitely varied and the container 12 will still be carried through a relatively "smooth" arc of travel.

Although the above example discusses rotation of the container from zero to 90 degrees, it should be recognized that rotation can extend beyond 90 degrees. For example, if the load has a tendency to stick to the container 12, it may be preferable to rotate the container 12 beyond the 90 degree arc to insure complete dumping of its contents. In one embodiment, the trolley 38 stops directly over the hinge 22, and the winch 42 lets out enough hoist cable 46 to permit the container 12 to rotate beyond the 90 degree arc to sufficiently empty the contents of the container 12. In an alternative embodiment, the trolley 38 moves beyond the vertical point directly above the hinge 22 as the winch 42 simultaneously lets out sufficient hoist cable 46 to rotate the container beyond 90 degrees. In this embodiment, any side load to the hoist assembly 26 would be reduced or eliminated entirely.

Once the contents have been dumped, the winch motor 44 and hoist motor 72, reverse direction to return the container 12 to the wheeled base 20. The rewind hoist motor 72 rotates the shaft 66 and corresponding wheel 68 in the opposite direction to pull the trolley 38 along the guide rail 36 towards the winch 42. As the trolley 38 moves along the guide rail 36, the lower block 74 and fastener 78 are similarly pulled along, moving the container 12 away from the hopper 84. Similarly, the winch motor 44 rotates the winch shaft 45 and drum 47 in the opposite direction, causing the hoist cable 46 to unwind from the drum 47. As the hoist cable 46 unwinds, the lower block 74 and fastener 78 drop downward, lowering the container 12 onto the wheeled base 20. The aspect ratio of vertical to horizontal forces used to lower or return the container 12 is typically the same as that used to raise or tip the container 12. In one embodiment, as the container 12 is lowered from about 90 degrees to about 61 degrees, the aspect ratio of the vertical and horizontal forces is approximately 10:90. As the container 12 is lowered from about 60 degree to about 31 degrees, the aspect ratio of the vertical and horizontal forces is approximately 50:50. Finally, as the container 12 is lowered from about 30 degrees to about zero degrees, the aspect ratio of the vertical and horizontal forces is approximately 90:10. After the empty container 12 has been place back onto the wheeled base 20, the fastener 78 is disconnected from the container 12 and the gondola removed from underneath the gondola tipping apparatus 10, 100.

An example of the winch speeds and trolley speeds that may be used to rotate the container 12 about its hinge 22 are provided in Table 1.

TABLE 1

| Arc (Degrees) | Winch Speed (ft/min) | Trolley Speed (ft/min) |
|---|---|---|
| 0-30 | 14 | 4 |
| 31-60 | 7 | 24 |
| 61-90 | 1 | 45 |

In another embodiment, the winch motor 44 and rewind hoist motor 72 can operate at infinitely variable speeds. A programmable logic controller (PLC) can be used to continuously vary the speed of the motors 44, 72 so that at each point along the arc during the raising and lowering of the container 12, the resultant force is tangential to the arc.

Various alternatives and embodiments are contemplated as being within the scope of the following claims particularly pointing out and distinctly claiming the subject matter regarded as the invention.

What is claimed is:

1. A gondola tipping apparatus for tipping a container from a first orientation to a second orientation, the gondola tipping apparatus comprising:

- a beam extending in a first direction;
- a trolley supported on the beam and movable along the first direction;
- a lower block including a sheave for connection to the trolley and a fastener for engaging the container; and
- a hoist assembly including
  - a first cable reeved about a sheave of the trolley and the sheave of the lower block,
  - a winch for receiving the first cable and operable to wind and unwind the first cable to move the lower block relative to the trolley along a second direction,
  - a second cable coupled to the trolley, and
  - a rewind hoist for receiving the second cable and operable to wind and unwind the second cable to move the trolley along the first direction.

2. The gondola tipping apparatus of claim 1, and further comprising an equalizing pulley coupled to a structural member of the gondola tipping apparatus, wherein the first cable is reeved about the equalizing pulley.

3. The gondola tipping apparatus of claim 2 wherein the first cable includes a first end fixed to the winch and a second end fixed to the lower block.

4. The gondola tipping apparatus of claim 2 wherein the first cable includes a first end fixed to the winch and a second end fixed to the trolley.

5. The gondola tipping apparatus of claim 1, and further comprising a shock absorber, wherein the first cable includes a first end fixed to the winch and a second end fixed to the shock absorber.

6. The gondola tipping apparatus of claim 5 wherein the shock absorber is mounted to a structural member of the gondola tipping apparatus.

7. The gondola tipping apparatus of claim 1, and further comprising a first variable speed motor coupled to the winch, a second variable speed motor coupled to the rewind hoist, and a controller for controlling the winch and the rewind hoist.

8. The gondola tipping apparatus of claim 7 wherein the container is movable from a first orientation to a second orientation through a controlled arc of travel by a resultant force from the winch and the rewind hoist applied to the container at the fastener, and wherein the resultant force is substantially tangential to the arc of travel throughout the movement of the container.

9. The gondola tipping apparatus of claim 8, and further comprising at least one limit switch operable in combination with the controller to change the respective speeds of the winch and the rewind hoist to effect a change in the resultant force.

10. The gondola tipping apparatus of claim 7 wherein the container is movable from a first orientation to a second orientation through a controlled arc of travel by a resultant force from the winch and the rewind hoist applied to the container at the fastener, and wherein the resultant force is primarily vertical through a first portion of the arc of travel, substantially equal parts horizontal and vertical through a second portion of the arc of travel, and primarily horizontal through a third portion of the arc of travel.

11. The gondola tipping apparatus of claim 10, and further comprising at least one limit switch operable in combination with the controller to change the respective speeds of the winch and the rewind hoist to effect a change in the resultant force.

12. A gondola tipping apparatus for tipping a container from a first orientation to a second orientation, the gondola tipping apparatus comprising:

- a beam extending in a first direction;
- a trolley supported on the beam and movable along the first direction;
- a lower block having a sheave for connection to the trolley and having a fastener for engaging the container;
- a first cable reeved a plurality of times about at least one sheave of the trolley, reeved a plurality of times about at least one sheave of the lower block, and reeved about an equalizing pulley;
- a winch for receiving the first cable and operable to wind and unwind the first cable to move the lower block relative to the trolley along a second direction;
- a second cable coupled to the trolley; and
- a rewind hoist for receiving the second cable and operable to wind and unwind the second cable to move the trolley along the first direction.

13. The gondola tipping apparatus of claim 12 wherein the first cable includes a first end fixed to the winch and a second end fixed to the lower block.

14. The gondola tipping apparatus of claim 12 wherein the first cable includes a first end fixed to the winch and a second end fixed to the trolley.

15. The gondola tipping apparatus of claim 12, and further comprising a first variable speed motor coupled to the winch, a second variable speed motor coupled to the rewind hoist, and a controller for controlling the winch and the rewind hoist.

16. The gondola tipping apparatus of claim 15 wherein the container is movable from a first orientation to a second orientation through a controlled arc of travel by a resultant force from the winch and the rewind hoist applied to the container at the fastener, and wherein the resultant force is substantially tangential to the arc of travel throughout the movement of the container from the first orientation to the second orientation.

17. The gondola tipping apparatus of claim 16, and further comprising at least one limit switch operable in combination with the controller to change the respective speeds of the winch and the rewind hoist to effect a change in the resultant force.

18. The gondola tipping apparatus of claim 15 wherein the container is movable from a first orientation to a second orientation through a controlled arc of travel by a resultant force from the winch and the rewind hoist applied to the container at the fastener, and wherein the resultant force is primarily vertical through a first portion of the arc of travel, substantially equal parts horizontal and vertical through a second portion of the arc of travel, and primarily horizontal through a third portion of the arc of travel.

19. The gondola tipping apparatus of claim 18, and further comprising at least one limit switch operable in combination with the controller to change the respective speeds of the winch and the rewind hoist to effect a change in the resultant force.

20. A method of tipping a container from a first orientation to a second orientation with a gondola tipping apparatus, the method comprising:

- attaching a fastener to the container, the fastener being coupled to a trolley by a first cable;

applying a first force to the container by driving a winch engaged with the first cable;

providing a second cable coupled to the trolley;

applying a second force to the container by driving a rewind hoist engaged with the second cable;

varying the speeds of the winch and the rewind hoist to control the magnitudes of the first and second forces in order to tip the container through a smooth arc of travel.

21. The method of claim 20 wherein the first force is a vertical force, and the second force includes a horizontal force component.

22. The method of claim 21 wherein tipping the container includes:

applying the vertical force with a magnitude about nine times that of the horizontal force through a first third of the arc;

applying the horizontal force and the vertical force with substantially equal magnitudes through a second third of the arc; and applying the horizontal force with a magnitude about nine times that of the vertical force through a final third of the arc.

23. The method of claim 20, and further comprising tipping the container through an arc path of travel, and controlling the respective speeds of the winch and the rewind hoist such that a resultant force consisting of the first force and the second force is substantially tangential to the arc path of travel throughout the tipping of the container.

* * * * *